(12) United States Patent
Bowell

(10) Patent No.: US 6,511,251 B2
(45) Date of Patent: *Jan. 28, 2003

(54) TABLE CONSTRUCTION

(76) Inventor: Martin Bowell, Elland House, Stratford Road, Mickleton, Nr. Chipping Campden, Gloucestershire GL55 6SR (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,480

(22) Filed: Oct. 29, 1999

(65) Prior Publication Data

US 2002/0159832 A1 Oct. 31, 2002

(51) Int. Cl.[7] ................................................ F16B 12/00
(52) U.S. Cl. ..................... 403/231; 403/230; 403/382; 403/403
(58) Field of Search ................................ 403/401–403, 403/382, 231, 230; 52/715, 656.9

(56) References Cited

U.S. PATENT DOCUMENTS

| 4,032,242 A | 6/1977 | Morris |
| 4,120,600 A | 10/1978 | Rees |

FOREIGN PATENT DOCUMENTS

| GB | 742617 | 12/1955 |
| GB | 971553 | 9/1964 |
| GB | 1151194 | 5/1969 |

*Primary Examiner*—Lynne H. Browne
*Assistant Examiner*—Michael P Ferguson
(74) *Attorney, Agent, or Firm*—Young & Thompson

(57) ABSTRACT

A corner bracket for the manufacture of a table comprises a central bridge portion 18 having an aperture for co-operation with a leg fixing 26, together with angled rail plate portions 20 to either side of the bridge portion, each having an aperture for receiving a side rail fixing. Each rail plate portion 20 includes an angled table top plate portion 22 having an aperture for receiving a table top fixing. The bracket simplifies flat pack table construction and avoids the potential weakening of the side rails associated with conventional corner arrangements.

9 Claims, 2 Drawing Sheets

TABLE CONSTRUCTION

BACKGROUND OF THE INVENTION

This invention relates to the construction of tables and in particular, but not exclusively, to flat pack kits for the construction of tables.

A common design of rectangular table comprises a table top, four legs at each corner of the table and a rail secured to the lower surface of the table top and extending between adjacent legs. A typical flat pack kit contains a table top/rail sub-assembly, the four table legs and various fixings. The sub-assembly consists of the table top with the four rail elements glued and dowelled in position with the rails at each corner being bridged by a bent metal corner bracket. The corner bracket comprises a bridging portion and two side plates, the outer edges of each of which are turned through 90° to fit into grooves formed in the inner surface of the rails.

This customary arrangement has several disadvantages. Assembling the rail elements to the table top prior to the shipping of the flat pack kit is costly and time consuming.

BRIEF SUMMARY OF THE INVENTION

Each rail needs to be slotted at either end to receive the turned-over lip of the bracket; a hole needs to be drilled in the upper surface of the rail at each end to receive a dowel, and corresponding holes have to be drilled in the under surface of the table top. Thereafter the rails must be secured to the underside of the table top by gluing and the four metal corner brackets must be screwed into position by wood screws using pilot holes previously provided. All these operations take time and therefore increase the cost of production. In addition, much furniture these days is produced of medium density fibreboard (MDF) and we have found that the provision at each end of the rails in close proximity to a hole for a dowel and a slot for the bracket, in conjunction with the stresses induced by the screw fixing for the bracket, can cause delamination of the rail element to occur, especially between the base of the groove and the dowel bore. Furthermore, shipping the flat pack with the table top assembled to the rails increases the possibility of damage to the sub-assembly during transit. If damage should occur then it is necessary to disassemble the sub-assembly and repair the damaged components, rather than simply replacing the damaged components. Furthermore the provision of the table top/rail sub-assembly often means that the minimum depth of the pack is defined by the combined depth of the table top and the rails whereas it would be possible to make the pack thinner if the rails were laid parallel to the table top.

Accordingly I have developed a new design of table incorporating a innovative bracket which mitigates at least some of the above disadvantages.

Thus, in one aspect of this invention there is provided a table, comprising:
a table top element;
a plurality of floor-standing legs projecting downwardly from the lower surface of said table top element at respective corner regions;
a plurality of rail elements depending from the lower surface of the table top element with respective twos of the rail elements converging at a corner region to define respective location regions for abutting and locating the upper portion of a respective leg;
a corner bracket in each of said corner regions, each corner bracket comprising:
a central bridge portion having means for co-operating with a fixing for securely locating said leg relative to said bracket and said rails;
two respective rail plate portions disposed at opposite sides of said bridge portion, each rail plate portion having means for co-operating with an adjacent portion of an adjacent rail element for securely locating said rail element relative to said bracket, and
one or more table top plate portions disposed generally perpendicularly to said wing plate portions and having means for co-operating with a fixing for securely locating said table top means relative to said bracket.

Preferably, each bracket includes two table top plate portions, each extending from the upper edge of one of the rail plate portions respectively.

The angular configuration of the bracket will depend on the design of the table; thus for a square or rectangular table top the planes defined by the rail plate portions will intersect at 90°, whilst for octagonal tables they will intersect at 135°, and so on for other shapes.

The means for co-operating with the fixing may comprise a plan or countersunk circular aperture, with typical fixings for the rail plate portions and table top plate portions comprising wood screws. The fixings for the bridge portion preferably comprise a threaded bolt or stud or the like which allows adjustment thereof to pull the leg tightly towards the bracket and the rail ends to provide a stable and secure load-bearing arrangement.

The invention also extends to a bracket as described above for use in the construction of a table or the assembly of a flat-pack kit.

In a further aspect, this invention provides a corner bracket for securing together two surface elements at a predetermined angle and a third surface element substantially perpendicular to said first and second surface elements, said bracket comprising a mid portion having at opposite ends respective side elements for locating and engaging in use said first and second surface elements, said bracket further comprising support means for locating and engaging in use said third surface element, wherein said mid portion, said side elements and said support means each include fixing apertures. Preferably said mid portion fixing aperture is substantially coincident with a plane bisecting the angle formed by the planes defined by the side elements.

Whilst the invention applies to the construction of furniture generally, it has particular application to the flat pack furniture industry. Accordingly the invention also extends to a kit for the manufacture of a table, said kit including in disassembled form a table top, a plurality of legs, a plurality of rail elements and plurality of brackets as defined above.

Whilst the invention has been described above it extends to any inventive combination of the features set out above or in the following description.

BRIEF DESCRIPTION OF THE DRAWINGS

The invention may be performed in various ways and, by way of example only, an embodiment thereof will now be described in detail, reference being made to the accompanying drawings, in which.

DETAILED DESCRIPTION OF THE INVENTION

Throughout the Specification, the terms "upper", "lower", etc refer to the table and the components thereof when the table is assembled and standing on a horizontal surface.

Figure 1:
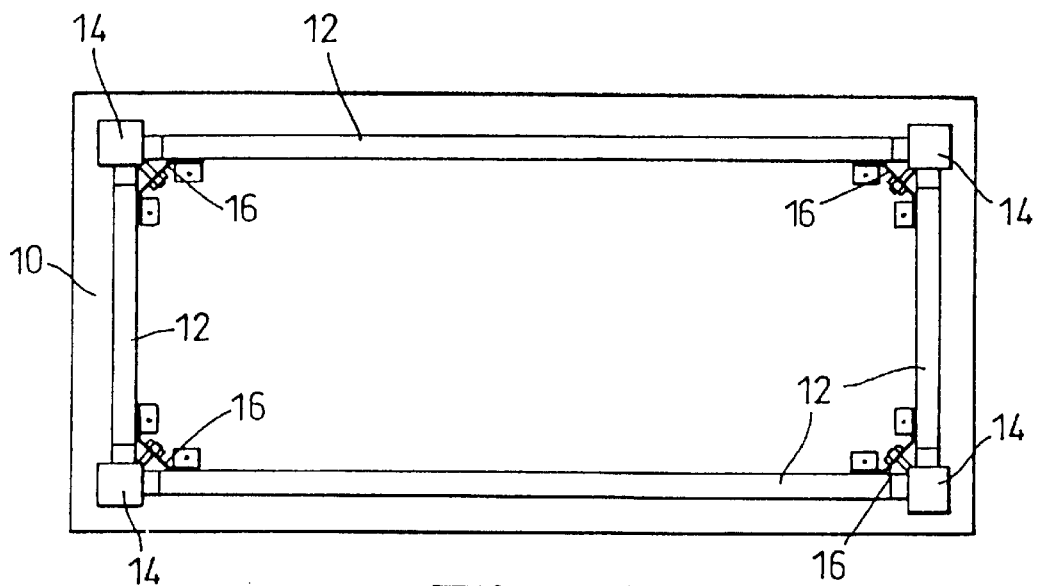
FIG. 1 is an underneath plan view of a table constructed in accordance with this invention.
Figure 2:
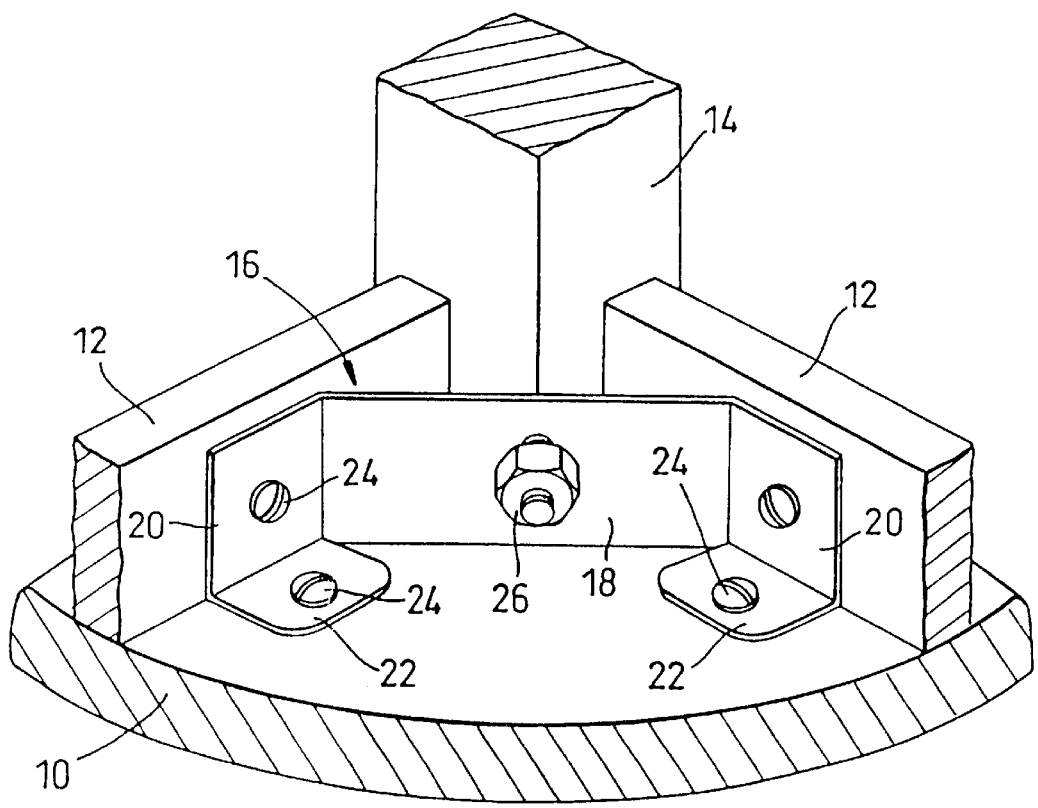
FIG. 2 is a detailed schematic view on a corner bracket of the arrangement of FIG. 1, and FIGS. 3a and 3b are elevation and top plan views respectively of the bracket used in this invention.
Figure 3A:
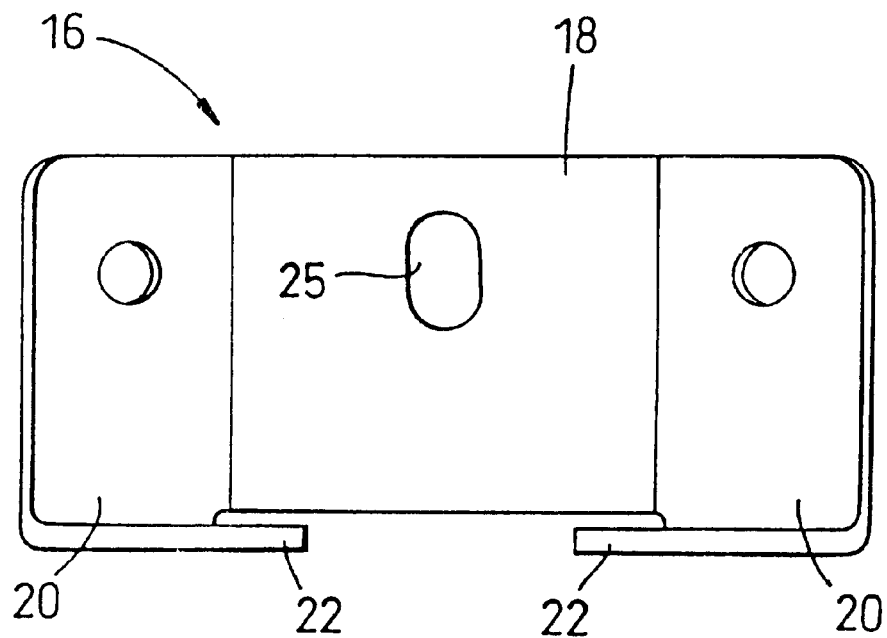
Figure 3B:
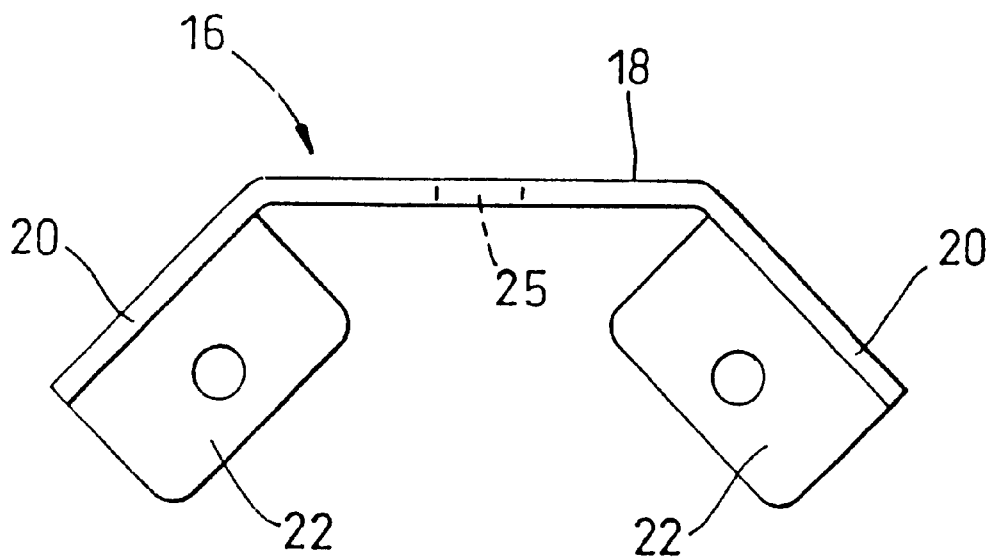

The table comprises a table top 10, four rails 12, four legs 14 and four rigid brackets 16. In this arrangement, the only form of attachment between each rail and the table top is via the brackets 16 at opposite ends thereof. No dowelling, gluing or any other form of attachment is involved. Referring now to FIG. 2, each bracket 16 is made of metal and comprises a bridge portion 18, rail plate portions 20 extending from opposite ends of the bridge portion 18, and table top plate portions or folded over tabs 22 extending from each rail plate portion Each of the plate portions includes a circular aperture through which a wood screw 24 is passed to secure the bracket tightly and securely to the adjacent rail or table top. The bridge portion includes a circular-ended slot 25 (seen in FIG. 3a) through which a bolt 26 passes to be received in a threaded insert previously secured in the upper portion of the leg 14. The slot 25 allows for slight variations in vertical position of the leg or insert relative to the bracket.

In use, the manufacturer prepares the table top, drilling eight pilot holes in the under surface thereof, and provides each of the rails with a pilot hole at each end. The requirement for drilling 8 mm dowel holes and slots is removed. The various components making up the table may be collected into a flat pack with the rails 12 being either laid flat on the undersurface of the table top or being placed around the periphery of the table top to protect it during transit. Either way the depth of the package may be reduced.

On receipt of the flat pack, the end user attaches the rails to the underside of the table top using the brackets 16 and wood screws 24 provided in the flat pack kit. Thereafter the legs 14 are offered up into each corner region and then secured by passing the bolt 26 through the bolt hole in the bridge portion 18 and tightening it as necessary to pull the leg into secure stable engagement with the ends of the rails 12 thus providing a secure assembly. Where the nature of the item of furniture demands a more robust attachment, the size of this bracket may be increased accordingly, and additional fixing holes provided.

The brackets allow robust articles of furniture to be constructed without requiring mortice and tenon Joints and the like, and without requiring a slot to be formed in the rails. Furthermore the bracket is a principle construction element used both in assembly of the furniture components and later structural rigidity, rather than being a reinforcing element which is applied only after the other components have been assembled.

What is claimed is:

1. A table, comprising:
    a table top element;
    a plurality of floor-standing legs projecting downwardly from the lower surface of said table top element at respective corner regions;
    a plurality of rail elements depending from the lower surface of the table top element with the rail elements converging at corner regions to define respective location regions for abutting and locating the upper portion of a respective leg;
    a rigid corner bracket in each of said corner regions, each corner bracket comprising:
        a central bridge portion having an aperture for co-operating with a fixing for securely locating said leg relative to said bracket and said rails;
        two respective rail plate portions disposed at opposite sides of said bridge portion, each rail plate portion having an aperture for co-operating with a fixing to an adjacent portion of an adjacent rail element for securely locating said rail element relative to said bracket, and
        two separate table top plate portions extending toward each other and each extending perpendicularly from a respective said rail plate portion and each having separate means for co-operating with a respective fixing for securely locating said table top element relative to said bracket.

2. A table according to claim 1 having four legs, wherein the planes defined by the rail plate portions intersect at 90°.

3. A table according to claim 1 having eight legs, wherein the planes defined by the rail plate portions intersect at 135°.

4. A table according to claim 1 wherein said means for co-operating with said table top element fixing comprises a circular aperture at slot.

5. A rigid corner bracket for use in the construction of a table of the type comprising a table top element, a plurality of floor-standing legs projecting downwardly from the lower surface of said table top element at respective corner regions and a plurality of rail elements depending from the lower surface of the table top element with the rail elements converging at corner regions to define respective location regions for abutting and locating the upper portion of a respective leg, the corner bracket comprising:
    a central bridge portion having an aperture for co-operating in use with a fixing for securely locating said leg relative to said bracket and said rails;
    two respective rail plate portions disposed at opposite sides of said bridge portion, each rail plate portion having an aperture for co-operating in use with an adjacent portion of an adjacent rail element for securely locating said rail element relative to said bracket, and
    two separate table top plate portions extending toward each other and each extending perpendicularly from a respective said rail plate portion and each having an aperture for co-operating in use with a respective fixing for securely locating said table top means relative to said bracket.

6. A rigid corner bracket for securing together surface elements at a predetermined angle and a surface element substantially perpendicular to first and second surface elements, said bracket comprising a mid portion having at opposite ends respective side elements for locating and engaging in use first and second surface elements, said bracket further comprising two separate other surface support elements extending toward each other and each extending perpendicularly from a respective one of said side elements, for locating and engaging in use a third surface element, wherein said mid portion, said side elements and said other surface support elements each include separate fixing apertures.

7. A corner bracket according to claim 6 wherein said mid portion fixing aperture is substantially coincident with a plane bisecting the angle formed by the planes defined by the side elements.

8. A kit for the manufacture of a table, said kit including in disassembled form a table top, a plurality of legs, a plurality of rail elements and a plurality of corner brackets according to claim 5.

9. A kit for the manufacture of a table, said kit including in disassembled form a table top, a plurality of legs, a plurality of rail elements and a plurality of corner brackets according to claim 6.

* * * * *